United States Patent [19]

Payne

[11] 4,194,307

[45] Mar. 25, 1980

[54] SAMPLE DISPLAY DEVICE

[75] Inventor: Ellis P. Payne, Lancaster, Pa.

[73] Assignee: Armstrong Cork Company, Lancaster, Pa.

[21] Appl. No.: 942,985

[22] Filed: Sep. 18, 1978

[51] Int. Cl.[2] .................... G09B 25/00

[52] U.S. Cl. .................... 35/49; 35/55; 40/312; 206/44.11

[58] Field of Search .................... 217/11, 58; 35/55, 49; 40/312, 313; 206/44.11, 45.11, 457

[56] References Cited

U.S. PATENT DOCUMENTS

| | | | |
|---|---|---|---|
| 246,873 | 9/1881 | Ducker | 217/58 |
| 1,156,644 | 10/1915 | Vetter | 206/44.11 |
| 1,245,378 | 11/1917 | Pepperberg | 217/58 |
| 2,111,382 | 3/1938 | Bennett | 206/44.11 |
| 2,376,916 | 5/1945 | Harden | 40/312 |
| 3,590,500 | 7/1971 | Smith | 35/49 |

FOREIGN PATENT DOCUMENTS

| | | | |
|---|---|---|---|
| 553776 | 6/1943 | United Kingdom | 40/312 |
| 1015749 | 1/1966 | United Kingdom | 206/44.11 |

*Primary Examiner*—Harland S. Skogquist

[57] ABSTRACT

The invention is directed primarily to a display device for floor tile. The display device mounts on the top of a carton of floor tile with one floor tile positioned within the display device. The display device also has a provision for a photo showing the particular tile product in use in a room display scene.

3 Claims, 3 Drawing Figures

SAMPLE DISPLAY DEVICE

BACKGROUND OF THE INVENTION

1. Field of the Invention

The invention is directed to a display device and, more particularly, to a display device for floor tile.

2. Description of the Prior Art

U.S. Pat. Nos. 1,185,165; 1,733,406; and 3,849,917 are display devices similar in nature to that disclosed herein.

SUMMARY OF THE INVENTION

The display device is formed from two parts. One part is a base member which is designed to be mounted over the top of a carton containing a plurality of floor tile. The base member has a recessed top into which a floor tile may be positioned for display purposes. The second part of the display device is a vertical display for holding a photograph of the floor tile used in a room scene. The holder for the photograph is mounted at the back of and perpendicular to the base member holding the sample floor tile.

DESCRIPTION OF THE PREFERRED EMBODIMENT

The display device herein is primarily designed for displaying floor tile. In many flooring retail stores, floor tile is displayed by simply stacking cartons of floor tile upon the display room floor and opening the top box so that one may see the design of the floor tile in the particular stack of tile. It has been found that customers tend to handle the individual tile, and a large amount of breakage results therefrom. Also, viewing an individual 12"×12" tile does not give one a good idea of what a total floor will look like when covered with the tile.

Consequently, the invention herein is primarily designed to prevent the handling of individual tiles with their resultant breakage and also to provide an indication of the total room effect one secures when using the tile in question.

Figure 1:
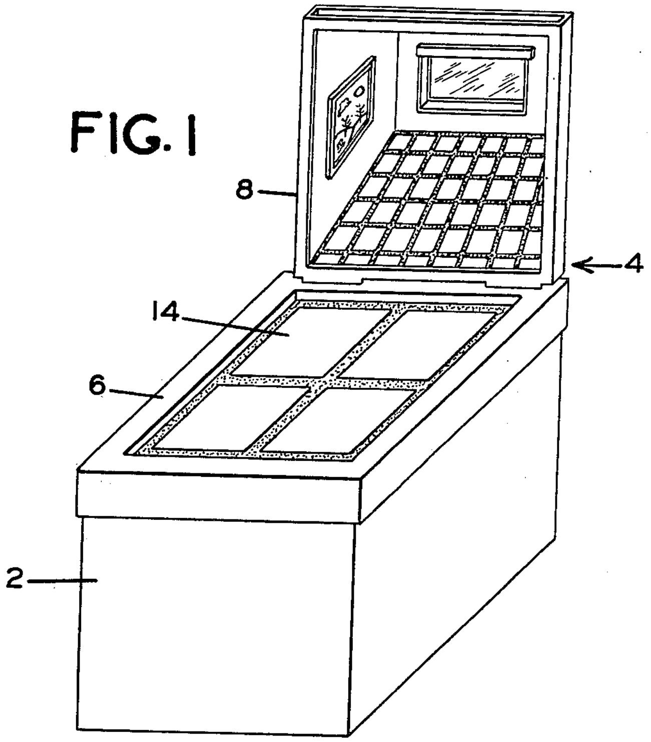
FIG. 1 is a perspective view of the invention herein in use.
Figure 2:
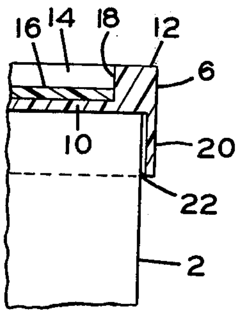
FIG. 2 is a cross-sectional view of the base member.

The display device is comprised of two parts—a horizontal base member and a vertical display member. FIG. 1 shows a tile carton 2 on the top of which has been placed the display device 4. The horizontal base member is element 6, and the vertical display member is element 8. Referring now to FIG. 2, the base member 6 is provided with a planar surface means 10. A ridge 12 extends around and upwardly from the top surface of the planar surface means to form a pocket means 14 to receive merchandise for display. In FIG. 2, a floor tile 16 is positioned within the pocket 14. The pocket 14 is sized to receive the floor tile so that the edges of the floor tile will be abutting the edges 18 of the ridges and so that the plane of the tile will be below the top edge of the ridge as shown in FIG. 2. A flange 20 extends around and downward from the flat bottom surface of the planar surface means 10 to form a second pocket means 22. The second pocket means is sized to receive the outer dimensions of a shipping carton 2. The top of the carton fits into the pocket 22, and the flange 20 extends around the sides of the carton. This then holds the display member on the top of the carton and forms a semipermanent closure to the top of the carton. Now one piece of tile would be removed from the carton and placed within pocket 14 for display.

Figure 3:
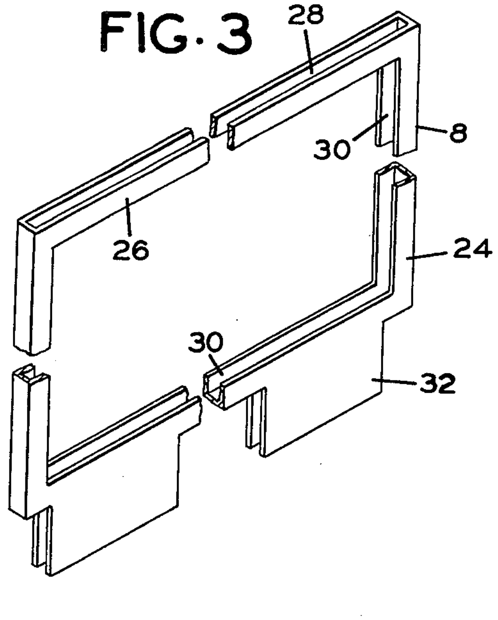
FIG. 3 is a partial perspective view of the vertical display member which is adapted to hold a photograph.

The second part of the display device is vertical display member 8 which is shown in FIG. 3. This is basically a four-sided, open center structure which has the two sides and bottom formed as U-shaped channel means. This structure is best shown in FIG. 3 where side 24 is partially broken away. The top side 26 of the display member has an opening 28; and, therefore, a photograph may be slid into opening 28, and it will be held in the grooves 30 of the side and bottom members. A tab 32 on the bottom of the display member will fit into a slot in the back of the top wall of ridge 12 and hold the display member 8 in a vertical position relative the base member 6. Any conventional means may be used to fasten together the two means 6 and 8. The photograph which is inserted into display member 8 will be a photograph of a room scene incorporating the floor tile design carried in the carton 2. Consequently, there is provided a display device which will fit over top of a carton of tile and display an individual tile on the top horizontal surface of the display device along with a photograph in a vertical holder positioned relative the back edge of the display device. The consumer may now see an actual tile and see a room scene incorporating the tile, yet the consumer is prevented from readily handling the individual tiles.

What is claimed is:

1. A display device comprising:

(a) a horizontal base member:

(1) said base member having a planar surface means;

(2) a ridge extending around and upward from the top surface of the planar surface means to form a pocket means to receive merchandise for display, said pocket means being sized to receive said merchandise with its edges abutting the sides of the ridge and being below the top of the ridge;

(3) a flange extending around and downward from the bottom surface of the planar surface means to form a second pocket means to hold the base member in position, said second pocket means being sized to receive the outer size dimensions of a shipping carton capable of holding a stack of said merchandise, one piece of which is to be displayed;

(b) and a vertical display member:

(1) said display member being affixed to one edge of said base member and being perpendicular thereto; and (2) said display member having means to receive a sheet of paper containing descriptive information about said merchandise.

2. The display device of claim 1 wherein said vertical display member has a bottom and two side walls formed from U-shaped channels and into which can be inserted a sheet of descriptive material.

3. A display device as set forth in claim 2 wherein the base member is provided with slots in the top of the ridge on the back side thereof and wherein said display member is provided with projections on the bottom edge thereof so that the slots and projections may interengage to hold the display member perpendicular to the back edge of the base member.

* * * * *